United States Patent
Gerhart et al.

(10) Patent No.: US 10,025,664 B2
(45) Date of Patent: Jul. 17, 2018

(54) SELECTIVE BUFFER PROTECTION

(71) Applicant: Western Digital Technologies, Inc., Irvine, CA (US)

(72) Inventors: Darin Edward Gerhart, Oronoco, MN (US); Nicholas Edward Ortmeier, Rochester, MN (US); Yasunobu Suginaka, Rochester, MN (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 14/979,278

(22) Filed: Dec. 22, 2015

(65) Prior Publication Data
US 2017/0177438 A1 Jun. 22, 2017

(51) Int. Cl.
G11C 29/00 (2006.01)
G06F 11/10 (2006.01)
G06F 3/06 (2006.01)

(52) U.S. Cl.
CPC .......... G06F 11/1076 (2013.01); G06F 3/064 (2013.01); G06F 3/0619 (2013.01); G06F 3/0629 (2013.01); G06F 3/0656 (2013.01); G06F 3/0673 (2013.01); G06F 2212/1052 (2013.01)

(58) Field of Classification Search
CPC .. G06F 11/1076; G06F 3/0629; G06F 3/0619; G06F 3/064; G06F 3/0656; G06F 3/0673; G06F 2212/1052
See application file for complete search history.

(56) References Cited

U.S. PATENT DOCUMENTS

| 6,400,728 | B1* | 6/2002 | Ott | H03M 13/09 370/310 |
|---|---|---|---|---|
| 6,944,717 | B2 | 9/2005 | Yoneyama et al. | |
| 7,761,649 | B2 | 7/2010 | Lubbers | |
| 7,849,254 | B2 | 12/2010 | Ash et al. | |
| 7,966,450 | B2 | 6/2011 | Klein | |
| 8,732,396 | B2 | 5/2014 | Bert | |
| 8,838,893 | B1 | 9/2014 | Randall et al. | |
| 2010/0205367 | A1 | 8/2010 | Ehrlich et al. | |
| 2011/0161784 | A1* | 6/2011 | Selinger | G06F 11/1068 714/768 |
| 2012/0124448 | A1* | 5/2012 | Emerson | G06F 11/1052 714/758 |

(Continued)

OTHER PUBLICATIONS

"A method and apparatus to handle cache coherency in a cluster setup", Retrieved on Apr. 17, 2015 from https://priorart.ip.com/IPCOM/000229515, Published Aug. 2, 2013, 1 pg.

*Primary Examiner* — Thien Nguyen
(74) *Attorney, Agent, or Firm* — Patterson & Sheridan, LLP; Steven Versteeg (57) ABSTRACT

A data storage device may include a volatile memory device and a controller. The volatile memory device may include a plurality of sections. The controller may be configured to cause data to be stored to a section of the volatile memory device. The controller may also be configured to apply data protection to the data in response to determining that the data comprises a first type of data. The controller may also be configured to refrain from applying data protection to the data in response to determining that the data comprises a second type of data.

17 Claims, 4 Drawing Sheets

(56) References Cited

U.S. PATENT DOCUMENTS

| | | |
|---|---|---|
| 2013/0346723 A1 | 12/2013 | Kawamura |
| 2014/0006723 A1 | 1/2014 | Tammam et al. |
| 2014/0006898 A1* | 1/2014 | Sharon ................ H03M 13/356 714/755 |
| 2015/0379682 A1* | 12/2015 | Golas ........................ G06T 9/00 345/555 |
| 2017/0039104 A1* | 2/2017 | Kapoor ............... G06F 11/1068 |

* cited by examiner

| Buffer Section ~32 | Last Usage ~34 | Page Protection Bit Map ~36 | Last Write Timestamp ~38 | Last Access Timestamp ~40 |
|---|---|---|---|---|
| 0 | Customer Buffer | 0xFF300F... | 3/1/2015 05:29:03 | 4/10/2015 18:05:39 |
| 1 | Internal Media Scan | 0x000000... | 4/1/2015 03:55:42 | 4/1/2015 3:55:43 |
| 2 | Customer Media | 0x000000... | 4/15/2015 12:11:12 | 4/15/2015 12:11:12 |
| 3 | Customer Buffer | 0x1881F0... | 2/15/2015 07:52:00 | 2/16/2015 01:01:52 |
| 4 | Internal Logging | 0x000000... | 1/15/2015 06:18:22 | 1/15/2015 06:18:22 |
| ... | ... | ... | ... | ... |
| n | Customer Other | 0x000000... | 5/3/2015 21:40:10 | 5/3/2015 21:40:10 |

SELECTIVE BUFFER PROTECTION

TECHNICAL FIELD

This disclosure relates to buffer protection, and more particularly, to data protection for a mixed-use buffer.

BACKGROUND

Solid-state drives (SSDs) may be used in computers in applications where relatively low latency and high capacity storage are desired. For example, SSDs may exhibit lower latency, particularly for random reads and writes, than hard disk drives (HDDs). This may allow greater throughput for random reads from and random writes to a SSD compared to a HDD. Additionally, SSDs may utilize multiple, parallel data channels to read from and write to memory devices, which may result in high sequential read and write speeds.

SSDs may utilize a large cache or buffer for internal data management. For example, the buffer may store mapping tables that track where data is stored in the SSD non-volatile memory. In some examples, the buffer may also store customer data, in other words, data utilized by a host device, for example, after receiving data from the host and before writing the data to non-volatile memory, or after reading data from non-volatile memory and before communicating the data to the host. SSDs may overwrite customer data stored in the buffer by writing internal data to a portion of the buffer previously used to store customer data.

SUMMARY

In one example, a data storage device may include a memory device and a controller. The memory device may include a plurality of sections. The controller may be configured to cause data to be stored to a section of the volatile memory device. The controller may also be configured to apply data protection to the data in response to determining that the data includes a first type of data. The controller may be further configured to refrain from applying data protection to the data in response to determining that the data includes a second type of data.

In one example, a method includes causing, by a controller, data to be stored to a section of a volatile memory device. The volatile memory device may include a plurality of sections. The method may also include applying, by the controller, data protection to the data in response to determining that the data includes a first type of data, applying, by the controller, data protection to the data. The method may further include refraining from applying, by the controller, data protection to the data in response to determining that the data includes a second type of data.

In another example, a computer-readable storage medium stores instructions that, when executed, cause a controller of a data storage device to store data to a section of a volatile memory device. The volatile memory device may include a plurality of sections. The computer-readable storage medium may also store instructions that cause a controller to apply data protection to the data in response to determining that the data includes a first type of data. The computer-readable storage medium may also store instructions that cause a controller to refrain from applying data protection to the data in response to determining that the data includes a second type of data.

In another example, a system includes means for storing data to a section of a volatile memory device that includes a plurality of sections. The system may also include means for applying data protection to the data in response to determining that the data comprises a first type of data. The system may further include means for refraining from applying data protection to the data in response to determining that the data comprises a second type of data.

The details of one or more examples are set forth in the accompanying drawings and the description below. Other features, objects, and advantages will be apparent from the description and drawings, and from the claims.

DETAILED DESCRIPTION

In general, this disclosure describes techniques for selectively enabling protection of data stored in a data storage device buffer. For example, a controller in the data storage device may be configured to store data in a volatile memory such as a buffer. In some examples, the buffer may be a mixed-use buffer. For example, the buffer may store different types of data associated with different data sources. One type of data may include customer data (e.g., data associated with a host device) and another type of data may include non-customer data (e.g., data internal to the storage device, such as internal mapping tables or data stored by the non-volatile memory devices that is temporarily stored in the buffer during garbage collection or wear leveling operations). The controller may determine whether to apply data protection to the data stored in the buffer based on the type of data. For example, the controller may apply data protection if the data includes customer data while the controller may refrain from applying data protection if the type of data includes non-customer data.

Some data storage devices may apply an all-or-nothing approach to buffer protection. For example, some data storage devices do not apply data protection to data stored in a buffer, such that unrecoverable errors may occur when data written to, stored in, or retrieved from the buffer. In other examples, some data storage devices apply data protection to all of the data in a buffer, potentially performing unnecessary operations, reducing drive performing and requiring additional energy.

The techniques of this disclosure may enable a data storage device to selectively apply data protection based on the type of the data, applying data protection to some data stored in the buffer but not to other data stored in the buffer. In this way, the data storage device may protect data in the buffer while improving drive performance and efficiency. By applying data protection, the data storage device may provide end-to-end data protection to certain types of data. In other words, the data storage device may improve data integrity from the time the data is received to the time the data is read.

Figure 1:
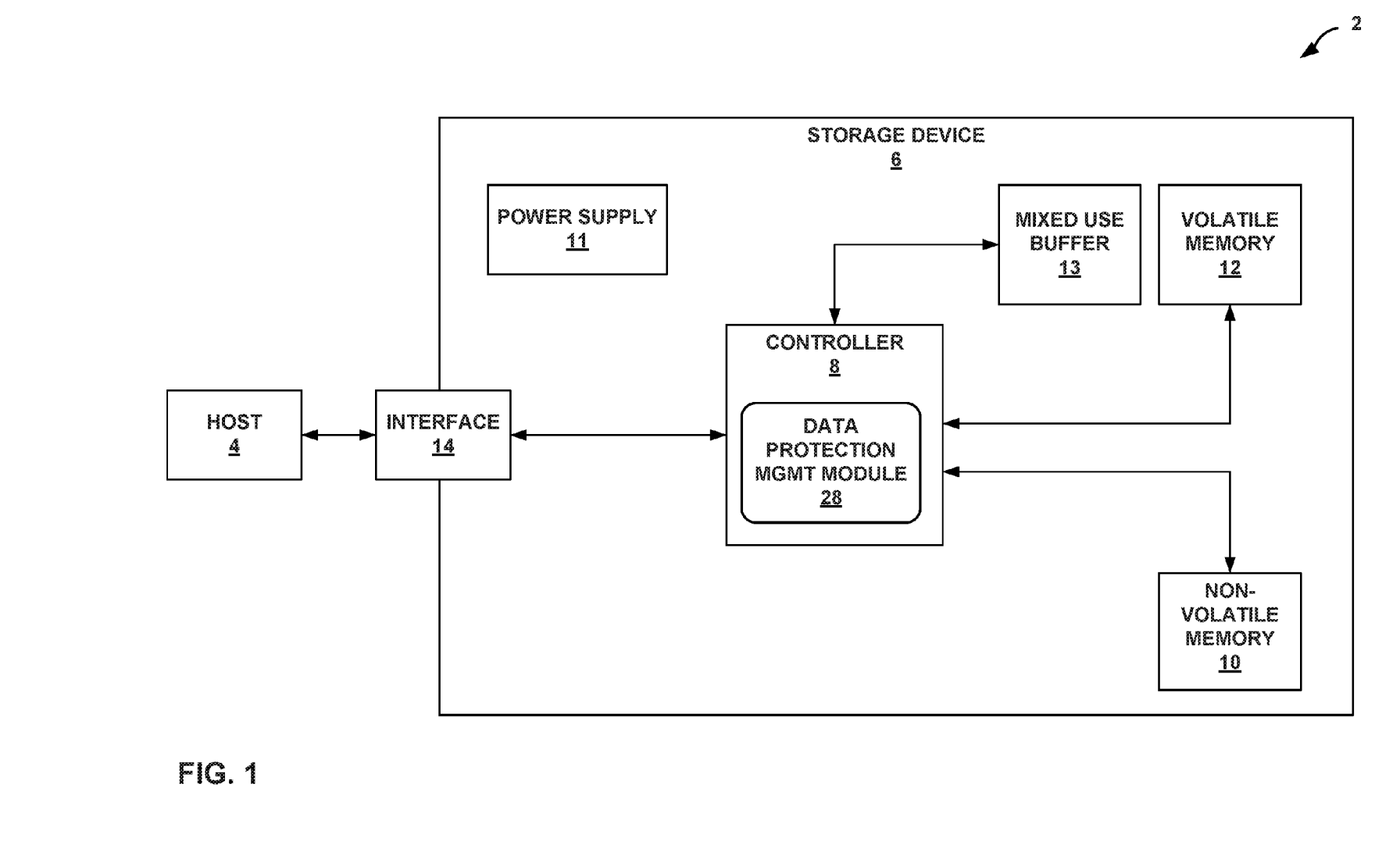
FIG. 1 is a conceptual and schematic block diagram illustrating an example storage environment in which a storage device may function as a storage device for a host device, in accordance with one or more techniques of this disclosure.

FIG. 1 is a conceptual and schematic block diagram illustrating an example storage environment 2 in which storage device 6 may function as a storage device for host device 4, in accordance with one or more techniques of this disclosure. For instance, host device 4 may utilize non-volatile memory devices included in storage device 6 to store and retrieve data. In some examples, storage environment 2 may include a plurality of storage devices, such as storage device 6, which may operate as a storage array. For instance, storage environment 2 may include a plurality of storages devices 6 configured as a redundant array of inexpensive/independent disks (RAID) that collectively function as a mass storage device for host device 4.

Storage environment 2 may include host device 4 which may store data to and retrieve data from one or more storage devices, such as storage device 6. As illustrated in FIG. 1, host device 4 may communicate with storage device 6 via interface 14. Host device 4 may comprise any of a wide range of devices, including computer servers, network attached storage (NAS) units, desktop computers, notebook (i.e., laptop) computers, tablet computers, set-top boxes, telephone handsets such as so-called "smart" phones, televisions, cameras, display devices, digital media players, video gaming consoles, video streaming device, and the like.

As illustrated in FIG. 1 storage device 6 may include controller 8, non-volatile memory 10 (NVM 10), power supply 11, volatile memory 12, and interface 14. In some examples, storage device 6 may include additional components not shown in FIG. 1 for sake of clarity. For example, storage device 6 may include a printed board (PB) to which components of storage device 6 are mechanically attached and which includes electrically conductive traces that electrically interconnect components of storage device 6, or the like. In some examples, the physical dimensions and connector configurations of storage device 6 may conform to one or more standard form factors. Some example standard form factors include, but are not limited to, 3.5" data storage device (e.g., an HDD or SSD) 2.5" data storage device, 1.8" data storage device, peripheral component interconnect (PCI), PCI-extended (PCI-X), PCI Express (PCIe) (e.g., PCIe×1, ×4, ×8, ×16, PCIe Mini Card, MiniPCI, etc.). In some examples, storage device 6 may be directly coupled (e.g., directly soldered) to a motherboard of host device 4.

Storage device 6 may include interface 14 for interfacing with host device 4. Interface 14 may include one or both of a data bus for exchanging data with host device 4 and a control bus for exchanging commands with host device 4. Interface 14 may operate in accordance with any suitable protocol. For example, interface 14 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), peripheral component interconnect (PCI), PCIe, non-volatile memory express (NVMe), or the like. The electrical connection of interface 14 (e.g., the data bus, the control bus, or both) is electrically connected to controller 8, providing electrical connection between host device 4 and controller 8, allowing data to be exchanged between host device 4 and controller 8. In some examples, the electrical connection of interface 14 may also permit storage device 6 to receive power from host device 4. For example, as illustrated in FIG. 1, power supply 11 may receive power from host device 4 via interface 14.

Storage device 6 may include NVM 10, which may include a plurality of memory devices. NVM 10 may be configured to store and/or retrieve data. For instance, a memory device of NVM 10 may receive data and a message from controller 8 that instructs the memory device to store the data. Similarly, the memory device of NVM 10 may receive a message from controller 8 that instructs the memory device to retrieve data. In some examples, each of the memory devices may be referred to as a die. In some examples, a single physical chip may include a plurality of dies (i.e., a plurality of memory devices). In some examples, each memory devices may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory device of NVM 10 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), magnetic memory devices, holographic memory devices, and any other type of non-volatile memory devices.

Flash memory devices may include NAND or NOR based flash memory devices, and may store data based on a charge contained in a floating gate of a transistor for each flash memory cell. In NAND flash memory devices, the flash memory device may be divided into a plurality of blocks which may divided into a plurality of pages. Each block of the plurality of blocks within a particular memory device may include a plurality of NAND cells. Rows of NAND cells may be electrically connected using a word line to define a page of a plurality of pages. Respective cells in each of the plurality of pages may be electrically connected to respective bit lines. Controller 8 may write data to and read data from NAND flash memory devices at the page level and erase data from NAND flash memory devices at the block level.

Storage device 6 may include power supply 11, which may provide power to one or more components of storage device 6. When operating in a standard mode, power supply 11 may provide power to the one or more components using power provided by an external device, such as host device 4. For instance, power supply 11 may provide power to the one or more components using power received from host device 4 via interface 14. In some examples, power supply 11 may include one or more power storage components configured to provide power to the one or more components when operating in a shutdown mode, such as where power ceases to be received from the external device. In this way, power supply 11 may function as an onboard backup power source. Some examples of the one or more power storage components include, but are not limited to, capacitors, super capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

Storage device 6 may include volatile memory 12, which may be used by controller 8 to store information. In some examples, controller 8 may use volatile memory 12 as a cache. For instance, controller 8 may store cached information in volatile memory 12 until the cached information is written to non-volatile memory 10. As illustrated in FIG. 1, volatile memory 12 may consume power received from power supply 11. Examples of volatile memory 12 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like).

In some examples, storage device 6 may include more than one volatile memory device 12. For example, storage device 6 may include a read/write buffer and mixed-use buffer 13. In some examples, mixed-use buffer 13 may include a plurality of sections, each section including a plurality of pages. Mixed-use buffer 13 may be used for storing customer data and non-customer data. Customer data may include data associated with host device 4, for example, data received from host device 4 as part of a write buffer command. In another example, customer data may include data received from host device 4 that is to be written to NVM 10 or data read from NVM 10 and waiting to be sent to host device 4. Non-customer data may include data associated with non-media or non-buffer commands or data internal to storage device 6. For example, non-media or non-buffer commands may include SCSI commands (e.g., log sense, mode sense, and the like). In some examples, data internal to storage device 6 may include data used for internal drive purposes, such as event or error logging, data read as part of background media scan or background self-test, garbage collection, wear leveling, or storing mapping tables that enable storage device 6 to track where data is stored in non-volatile memory 10.

Storage device 6 includes controller 8, which may manage one or more operations of storage device 6. Controller 8 may interface with host device 4 via interface 14 and manage the storage of data to and the retrieval of data from non-volatile memory 10, volatile memory 12, and/or mixed-use buffer 13.

Controller 8 may include data protection management module (DPMM) 28. DPMM 28 may selectively enable data protection in mixed-use buffer 13. In some examples, DPMM 28 may enable data protection based on the type of data stored in mixed-use buffer 13. For example, DPMM 28 may determine a type of data to be stored at a particular section of mixed-use buffer 13 and determine whether to apply data protection to the data to be stored at the particular section based on the type of data. For instance, DPMM 28 may determine that the type of data to be stored to a first section of mixed-use buffer 13 includes customer data. As a result, in some examples, DPMM 28 may cause controller 8 to apply data protection to the data to be stored at the first section of mixed-use buffer 13. In some examples, by applying data protection to the first section, controller 8 may detect and correct any errors that may occur while storing data to or retrieving data from mixed-use buffer 13 (e.g., due to inadvertent bit flips). In some examples, applying data protection to the first section may enable controller 8 to alert a device attempting to read data stored at the first section (e.g., host device 4) that the data stored at the first section was not written by the device. As another example, DPMM 28 may determine that the type of data to be stored to a second section of mixed-use buffer 13 includes non-customer data. As a result, in some examples, DPMM 28 may cause controller 8 to refrain from applying data protection to the data to be stored at the second section of mixed-use buffer 13. In some examples, by refraining from applying data protection to the data to be stored at the second section, DPMM 28 may reduce the number of operations performed by controller 8, thus potentially improving energy efficiency and device performance.

In this manner, DPMM 28 may enable controller 8 to selectively apply data protection to data stored in a mixed-use buffer. In contrast to some buffer protection techniques which may apply protection to all or none of the data stored in the buffer, the described techniques may enable controller 8 to determine whether to apply data protection to a certain subset of the data stored in mixed-use buffer 13. As a result, some data may be protected which may enable controller 8 to detect and correct errors, while other data may not be protected, which may improve the performance and efficiency of storage device 6. Controller 8 may provide end-to-end protection for certain types of data to improve the integrity of customer data from the time the data is received from host device 4 to the time the data is sent back to host device 4. The described techniques may enable controller 8 to store multiple types of data to mixed-use buffer 13, which may reduce the number of buffers dedicated for a specific purpose, potentially reducing the size and cost of production due to a reduction in memory devices utilized for buffers. Additional details of controller 8 are discussed below with reference to FIG. 2.

Figure 2:
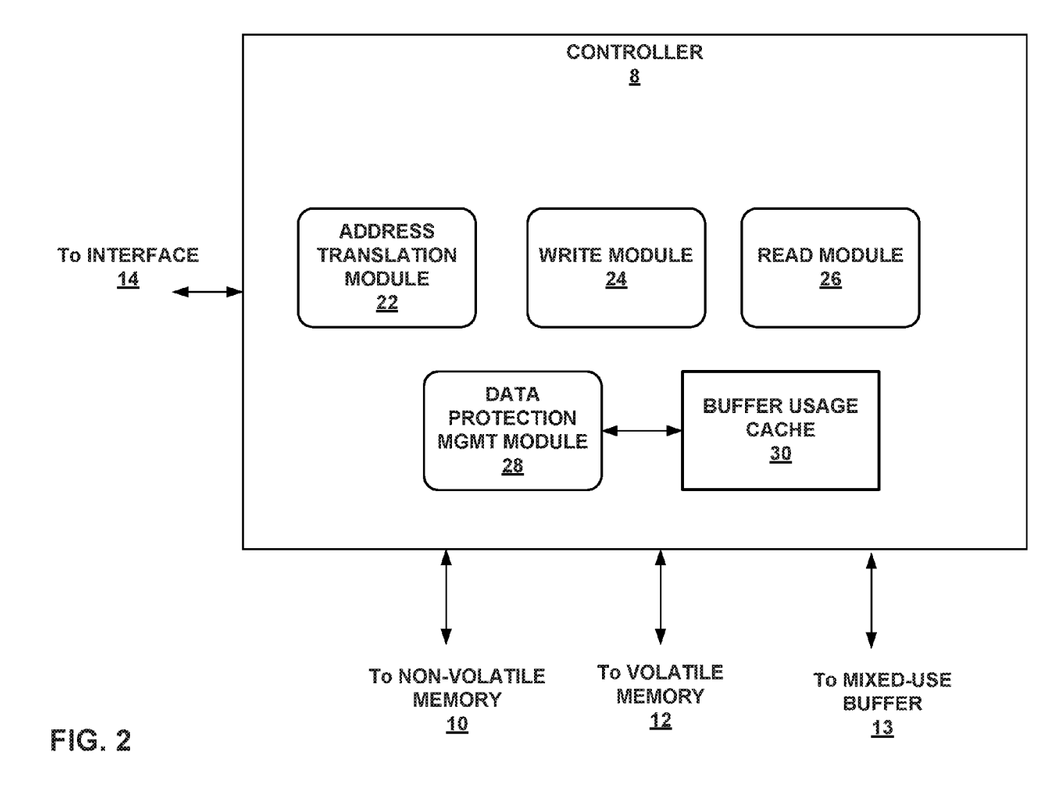
FIG. 2 is a conceptual and schematic block diagram illustrating an example controller, in accordance with one or more techniques of this disclosure.

FIG. 2 is a conceptual and schematic block diagram illustrating example details of controller 8. In some examples, controller 8 may include address translation module 22, write module 24, read module 26, DPMM 28, and buffer usage cache 30. In other examples, controller 8 may include additional modules or hardware units, or may include fewer modules or hardware units. Controller 8 may include a microprocessor, digital signal processor (DSP), application specific integrated circuit (ASIC), field programmable gate array (FPGA), or other digital logic circuitry. In some examples, controller 8 may be a system on a chip (SoC).

Controller 8 may interface with host device 4 via interface 14 and manage the storage of data to and the retrieval of data from NVM 10 and/or volatile memory 12. For example, write module 24 may receive a message from host device 4 via interface 14 instructing storage device 6 to store data associated at a logical address of NVM 10.

Write module 24 may communicate with address translation module 22, which manages translation between logical addresses used by host device 4 to manage storage locations of data and physical block addresses (PBAs) used by write module 24 to direct writing of data to NVM 10. Address translation module 22 may utilize a flash translation layer or table that translates logical addresses (or logical block addresses (LBAs)) of data stored by NVM 10 to physical block addresses of data stored by NVM 10. For example, host device 4 may utilize the logical block addresses of the data stored by NVM 10 in instructions or messages to storage device 6, while write module 24 utilizes physical block addresses of the data to control writing of data to NVM 10. (Similarly, read module 26 may utilize physical block addresses to control reading of data from NVM 10.) The physical block addresses correspond to actual, physical blocks of NVM 10. In some examples, address translation module 22 may store the flash translation layer or table in volatile memory 12.

In this way, host device 4 may be allowed to use a static logical block address for a certain set of data, while the physical block address at which the data is actually stored may change. Address translation module 22 may maintain the flash translation layer or table to map the logical block addresses to physical block addresses to allow use of the static logical block address by the host device 4 while the physical block address of the data may change, e.g., due to wear leveling, garbage collection, or the like.

As discussed above, write module 24 may perform one or more operations to manage the writing of data to NVM 10. For example, write module 24 may manage the writing of data to NVM 10 by selecting one or more blocks within NVM 10 to store the data and causing the selected blocks to actually store the data. As discussed above, write module 24 may cause address translation module 22 to update the flash translation layer or table based on the selected blocks. For instance, write module 24 may receive a message from host device 4 that includes a unit of data and a logical block address, select a block within NVM 10 to store the data, cause the selected block to actually store the data, and cause address translation module 22 to update the flash translation layer or table to indicate that the logical block address corresponds to the selected block within NVM 10.

Read module 26 similarly may control reading of data from NVM 10. For example, read module 26 may receive a message from host device 4 requesting data with an associated logical block address. Address translation module 22 may convert the logical block address to a physical block address using the flash translation layer or table. Read module 26 then may retrieve the data from the physical block addresses.

DPMM 28 may manage data protection of mixed-use buffer 13. DPMM 28 may determine whether to apply data protection to data to be stored in mixed-use buffer 13. In some examples, DPMM 28 may selectively apply data protection to some data to be stored in mixed-use buffer 13 while not applying data protection to other data to be stored in mixed-use buffer 13. For instance, DPMM 28 may determine to apply data protection to data to be stored in a first section of mixed-use buffer but determine to refrain from applying data protection to data to be stored in a second, different section of mixed-use buffer 13. In some examples, DPMM 28 may apply data protection by appending error detection data to a page within the particular section in which the customer data is stored. In some examples, error detection data may include parity bits, checksum data, cyclic redundancy check (CRC) data, error correction code (ECC), or the like. In some examples, error detection data may also be used to correct errors upon reading the data. For example, DPMM 28 may correct up to a predetermined number of errors based on the error detection data.

DPMM 28 may determine a type of data to be stored to mixed-use buffer 13. In some examples, DPMM 28 may determine whether the type of data to be stored in the particular section includes customer data or non-customer data. In some examples, customer data may include data associated with host device 4 (e.g., data received from host device 4 as part of a write buffer command, data received from host device 4 as part of a write command, or data previously written to NVM 10 by host device 4 and currently retrieved from NVM 10 as part of a read command). In some examples, non-customer data may include data associated with non-media or non-buffer commands (e.g., SCSI Mode Sense commands, SCSI Log Sense commands) or data used for purpose internal to storage device 6 (e.g., data used during device logging, media scan, or garbage collection).

DPMM 28 may determine to which section of mixed-use buffer 13 to store data based on the type of data to be stored in mixed-use buffer 13. For example, if DPMM 28 determines that the type of data includes customer data, DPMM 28 may determine to store the customer data in an empty section of mixed-use buffer 13 or a section of mixed-use buffer 13 that includes protected data. In some examples, if DPMM 28 determines that the type of data includes non-customer data, DPMM 28 may determine to store the data in an empty section of mixed-use buffer 13 or a section of mixed-use buffer 13 that does not include protected data.

DPMM 28 may determine whether to apply data protection to data to be stored in a particular section of mixed-use buffer 13 based on the type of data to be stored in the particular section. In response to determining that the type of data includes customer data, DPMM 28 may determine to apply data protection to the data. For example, DPMM 28 may store the customer data to one or more pages within a first section of mixed-use buffer 13 and may append error detection data to one or more pages of the particular section of mixed-use buffer 13. For instance, DPMM 28 may store the error detection within metadata associated with the customer data. In response to determining that the type of data includes non-customer data, DPMM 28 may determine to refrain from applying data protection and may store the non-customer data in one or more pages of a second section of mixed-use buffer 13. In some examples, DPMM 28 may refrain from mixing customer data and non-customer data within the same section of mixed-use buffer 13. Thus, in some examples, all of the data stored within a particular section of mixed-use buffer 13 either includes data protection or does not include data protection.

Buffer usage cache 30 may include any type of volatile memory device, such as RAM, DRAM, SRAM, SDRAM, or any other type of volatile memory device similar to volatile memory 12. In some examples, DPMM 28 may store information associated with the data stored in mixed-use buffer 13 in buffer usage cache 30. In some examples, DPMM 28 may store information associated with the data stored in mixed-use buffer 13 in NVM 10 or volatile memory 12. Buffer usage cache 30 may store information about each section of mixed-use buffer 13, such as a section usage identifier that indicates the type of data stored in the respective section and a protected page identifier that indicates whether any data stored in the respective section includes data protection. The protected page identifier may specify which pages, if any, include protected data. In some examples, a particular section of mixed-use buffer 13 includes only protected data or only unprotected data, such that the protected page identifier may indicate which pages within a protected section currently store data and which pages within a protected section do not currently store data. Thus, in some examples, DPMM 28 may determine which pages within a protected section already include data and which pages within the protected section may be used to store additional protected data based on the protected page identifier.

In some examples, controller 8 may copy information stored in buffer usage cache 30 to NVM 10 (e.g., to a system area of NVM 10). For example, controller 8 may copy at least a portion of the information to NVM 10 after the information is updated or new information is added. In some examples, controller 8 may copy the information to NVM 10 periodically, for example at a predetermined interval. In other examples, controller 8 may copy the information to NVM 10 during a system idle time. By copying information from buffer usage cache 30 to NVM 10, the information associated with the data stored in mixed-use buffer 30 may be retained and/or analyzed (e.g., to better understand how mixed-use buffer 13 is utilized).

In operation, as one example, controller 8 may receive a write buffer command and corresponding data from host device 4 via interface 14. DPMM 28 may determine that the type of the data to be stored in mixed-use buffer 13 includes customer data (e.g., because the data was received from host device 4). In response to determining that the type of data includes customer data, DPMM 28 may determine to which section of mixed-use buffer to store the received data. For example, DPMM 28 may query buffer usage cache 30 to find an empty section of mixed-use buffer 13 (e.g., a section that does not currently store any data) or find a section of mixed-use buffer 13 that already includes protected data. In response to determining that the type of data includes customer data, DPMM 28 may determine to apply data protection to the data. For example, DPMM 28 may determine to append error detection data to one or more pages within the section of mixed-use buffer 13. DPMM 28 may store the customer data in the determined section and append error detection data to the particular section (e.g., within metadata associated with the customer data). Thus, controller 8 may provide end-to-end protection of the customer data from the time the customer data is received from host device 4 until such time that the data is read back to host device 4.

DPMM 28 may store information associated with the data stored at the particular section in buffer usage cache 30. For example, DPMM 28 may store, in a section usage identifier within buffer usage cache 30, an indication of the type of data (e.g., customer data) stored at the particular section of mixed-use buffer 13. In some examples, DPMM 28 may store, in a protected page identifier within buffer usage cache 30, an indication of whether the section includes protected data. For example, because DPMM 28 determined that the type of data includes customer data, the protected page identifier may specify which pages include data protection.

As another example, controller 8 may receive a read command from host device 4 via interface 14. In response to receiving the read command, read module 26 may retrieve data from NVM 10. DPMM 28 may determine that the type of data includes customer data (e.g., because the data was retrieved from NVM 10). Because the data includes customer data, DPMM 28 may determine to apply data protection to the data. DPMM 28 may query buffer usage cache 30 to find an empty section or a section that currently stores protected data and has at least one free page. DPMM 28 may determine to store the data in an empty section or a protected section, may store the data retrieved by read module 26 to one or more pages of the determined section, and may store error detection data within metadata associated with the customer data by appending the error detection data to the particular section. DPMM 28 may store information associated with the data in buffer usage cache 30. For example, if the data was written to a previously empty section, DPMM 28 may update the section usage identifier to indicate that the section includes customer data and may update the protected page identifier to specify which pages of the section include data.

In response to DPMM 28 storing the data in the particular section of mixed-use buffer 13, controller 8 may copy the customer data from the particular section of mixed-use buffer 13 to host device 4. Controller 8 may read the error detection data associated with the customer data (e.g., from the metadata associated with the customer data) and determine whether the data includes any errors. In some examples, if controller 8 determines that the customer data includes errors, controller 8 may correct up to a predetermined number of errors based on the error detection data. By protecting the customer data from the time the customer data was received from host device 4 to the time the customer data is read back to host device 4, controller 8 improve the integrity of the customer data from end-to-end.

As an additional example, controller 8 may initiate a garbage collection procedure. In response to initiating the garbage collection procedure, read module 26 may retrieve data from NVM 10. DPMM 28 may determine whether to apply data protection to the retrieved data based on the type of data. In some examples, DPMM 28 may determine that the type of data includes customer data (e.g., because the retrieved data is associated with host device 4, having been previously written to NVM 10 in response to a command from host device 4). As a result, DPMM 28 may determine to apply data protection to the data. DPMM 28 may cause the data to be stored to a first, protected section of mixed-use buffer 13 and may apply data protection to the first protected section.

During the garbage collection procedure, controller 8 may update an LBA to PBA mapping table to map the LBA associated with the customer data to a new PBA. DPMM 28 may determine that the type of data for the LBA to PBA mapping table includes non-customer data (e.g., because the mapping table is used for internal drive purposes). As a result, DPMM 28 may determine to refrain from applying data protection to the mapping table. DPMM 28 may store the mapping table to a second, unprotected section of mixed-use buffer 13 and may refrain from applying data protection to the second, unprotected section of mixed-use buffer 13. DPMM 28 may store information associated with the data in buffer usage cache 30. For example, DPMM 28 may update a section usage identifier associated with the first, protected section to indicate that the first, protected section includes protected data and may update the protected page identifier to indicate which pages of the first, protected section include the customer data. Likewise, DPMM 28 may update a section usage identifier associated with the second, unprotected section to indicate the second, unprotected section does not include protected data and may ignore the protected page identifier because no pages in the section are protected.

Figure 3:
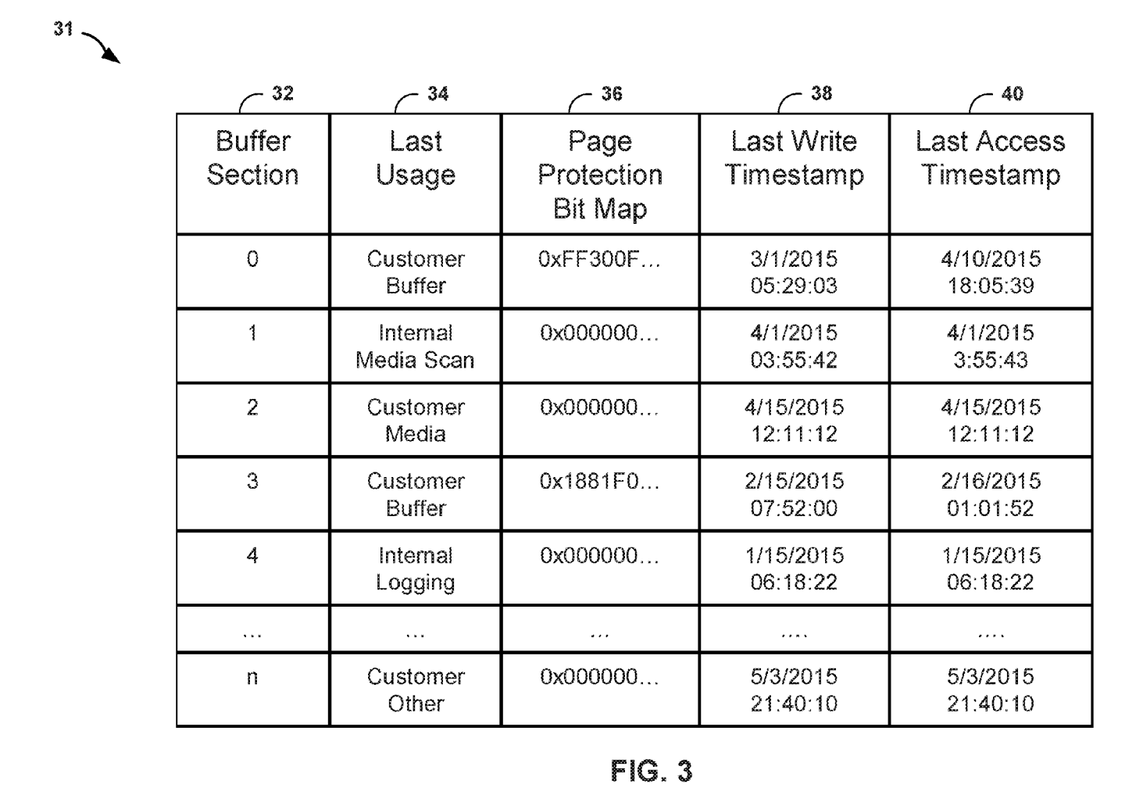
FIG. 3 is a conceptual and schematic block diagram illustrating example details of a buffer management lookup table, in accordance with one or more techniques of this disclosure.

FIG. 3 is a conceptual block diagram illustrating example details of a data structure used to store buffer usage information within buffer usage cache 30, in accordance with one or more techniques of this disclosure. For ease of illustration only, the data structure will be described as a buffer usage lookup table 31; however, the buffer usage information may be stored in any type of data structure, such as an array, database, or the like. For purposes of illustration, the buffer usage lookup table 31 will be described with reference to FIGS. 1 and 2.

Buffer usage lookup table 31 may store buffer usage information associated with each section of mixed-use buffer 13. For example, mixed-use buffer 13 may include N sections and buffer usage lookup table 31 may include N rows, one row for each section of mixed-use buffer 13. Each row may include a plurality of columns, each column including information about the respective section of mixed-use buffer 13.

For example, buffer usage lookup table 31 may include at least one of the columns Buffer Section 32, Last Usage 34, Page Protection Bit Map 36, Last Write Timestamp 38, and Last Access Timestamp 40. In some examples, buffer usage lookup table 31 may omit one or more of columns 34-40, may include other columns storing other information, or a combination thereof. Buffer section 32 may include a unique section identifier to identify the section of mixed-use buffer 13 associated with the respective row of data in buffer usage lookup table 31. Last Usage 34 may include a section usage identifier indicative of the type of data stored to the section. For example, the section usage identifier may include a text value or other identifier indicating of the type of data stored in the respective section. For instance, the value "Customer Buffer" may indicate the data within buffer section-0 includes customer data that was committed to mixed-use buffer 13 as part of a SCSI Write Buffer Command, the value "Internal Media Scan" may indicate the data within buffer section-1 includes data internal to storage device 6, the value "Customer Media" may indicate the data within section-2 includes customer data that was committed to mixed-use buffer 13 as part of a SCSI Read or Write Command, the value "Internal Logging" may indicate the data within buffer section-4 includes data internal to storage device 6, and the value "Customer Other" may indicate the data within buffer section-N includes customer data that was committed to mixed-use buffer 13 as part of some other SCSI Command. The described values are simply examples that may be used to indicate the type of data stored within sections of mixed-use buffer 13. However, other values may be used to indicate the type of data stored within sections of mixed-use buffer 13.

Page Protection Bit Map 36 may include a protected page identifier. For example, the protected page identifier may indicate which page or pages, if any, within the respective section include data protection. For instance, Page Protection Bit Map 36 may specify a bit map of all available pages in the section identified by Buffer Section 32 in a manner such that bit 0 corresponds to page 0, bit 1 corresponds to page 1, and so on. In this instance, if the bit is cleared (e.g. value equal to 0) then the resident data in the corresponding page has no protection. Conversely, if the bit is set (e.g. value equal to 1) then the resident data in the corresponding page has valid protection information. In another instance, Page Protection Bit Map 36 may specify the memory address for each page that includes protected data within the respective section. Because DPMM 28 may apply data protection to all data stored within a particular section, in some instances Page Protection Bit Map 36 may include the memory address for each page that includes data within the particular section.

Last Write Timestamp 38 may include a timestamp associated with the most recent time at which at least a portion of the data stored to the respective section was stored to the section. Last Access Timestamp 40 may include a timestamp associated with the most recent time at which the data stored to the respective section was accessed by controller 8.

In operation, controller 8 may perform various types of operations that cause controller 8 to store data to mixed-use buffer 13. For example, controller 8 may receive a write buffer command and corresponding data from host device 4. DPMM 28 may determine that the type of data includes customer data (e.g., because the data is associated with a command received from host device 4) and determine to apply data protection to the data. In some examples, DPMM 28 may determine to which section within mixed-use buffer 13 to store customer data based on the type of data and the existing data in mixed-use buffer 13. For example, because buffer usage lookup table 31 includes information associated with the data stored within mixed-used buffer 13, DPMM 28 may query buffer usage lookup table 31 to determine to which section to store the customer data. DPMM 28 may query the column Last Usage 34 of buffer usage lookup table 31 to determine whether there are sections within mixed-use buffer 13 that do not currently store data or that store protected data. In some examples, DPMM 28 may determine to store the customer data in an empty section of mixed-use buffer 13.

DPMM 28 may query columns Last Usage 34 and Page Protection Bit Map 36 to determine whether any sections that include existing protected data have empty pages that may be written to. For example, DPMM 28 may determine that a particular page within section-0 includes data because Page Protection Bit Map 36 includes a bit map (e.g., beginning with the hex digits "0xFF300F") that includes some cleared bits (e.g. bits with value of 0). In this case, DPMM 28 may calculate the page address of one or more pages that corresponds to one or more cleared bits in Page Protection Bit Map 36. DPMM 28 may store the customer data to the determined section pages. DPMM 28 may update Page Protection Bit Map 36 of buffer usage lookup table 31 to set one or more of the bits that are associated with the pages that contain the newly stored customer data. DPMM 28 may determine when data was last written to section-0, may determine a timestamp associated with the time at which data was last written to buffer section-0, and may store the timestamp to Last Write Timestamp 38.

In another example, where Page Protection Bit Map 36 contains list of page addresses, DPMM 28 may determine to store the customer data to a page of section-0 that does not have a corresponding memory address in the column Page Protected Bit Map 36. DPMM 28 may determine a section and one or more pages within the section to store the customer data. DPMM 28 may store the customer data to the determined section pages. DPMM 28 may update Page Protection Bit Map 36 of buffer usage lookup table 31 to include the mixed-use buffer memory address(es) associated with the newly stored customer data. DPMM 28 may determine when data was last written to section-0, may determine a timestamp associated with the time at which data was last written to buffer section-0, and may store the timestamp to Last Write Timestamp 38.

In some examples, host device 4 may send a read buffer command to controller 8 requesting data from a particular section (e.g., section-0) of mixed-used buffer 13. DPMM 28 may receive the read command and determine section-0 stores data associated with host device 4. For example, DPMM 28 may query the section usage identifier column (column Last Usage 34) to determine whether the value stored in column Last Usage 34 indicates that the section stores customer data. As illustrated in FIG. 3, the value stored in Last Usage 34 indicates that buffer section-0 includes customer data. As a result, DPMM 28 may determine that the data stored within section-0 includes customer data and use the error detection data to check for and correct errors in the corresponding customer data and may send the customer data to host device 4. In some examples, controller 8 may read the error detection data associated with the customer data (e.g., from the metadata associated with the customer data) and determine whether the customer data was retrieved without errors. In some examples, if controller 8 determines that the retrieved customer data includes errors, controller 8 may correct up to a predetermined number of errors based on the error detection data. In some instances, DPMM 28 may determine when section-0 was accessed, determine a timestamp associated with the time at which section-0 was accessed, and may store the timestamp to Last Access Timestamp 40.

In some examples, host device 4 may send a read buffer command to controller 8 requesting data from a different particular section (e.g., section-1) of mixed-use buffer 13. DPMM 28 may receive the command and determine that section-1 does not store data associated with host device 4. For example, DPMM 28 may determine that the value stored in column Last Usage 34 indicates section-1 includes data associated with an internal media scan. As a result, DPMM 28 may determine that the data stored within section-1 does not include customer data and may send a message to host device 4 indicating the section does not include customer data.

Figure 4:
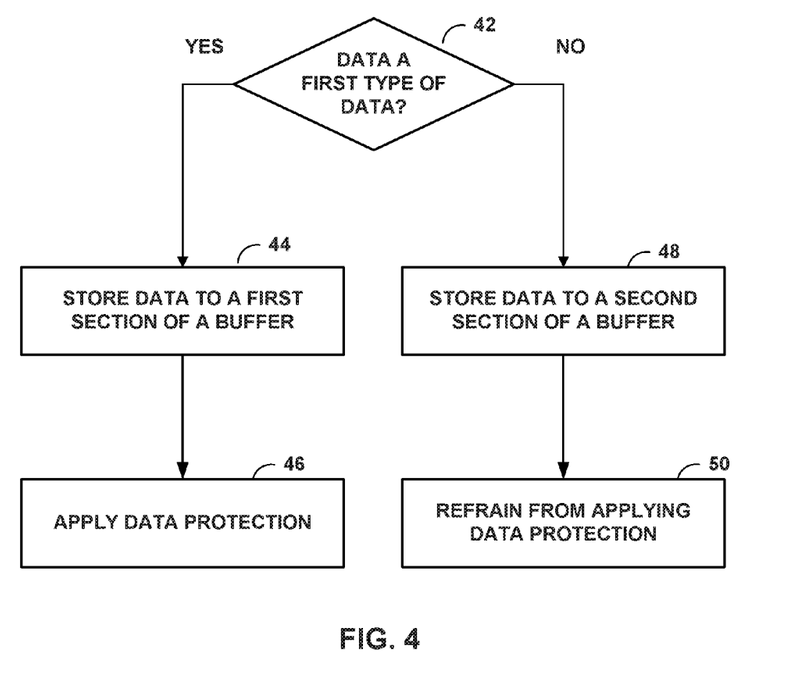
FIG. 4 is a flow diagram illustrating an example technique for selectively protecting buffer data, in accordance with one or more techniques of this disclosure.

FIG. 4 is a flow diagram illustrating an example technique for selectively protecting buffer data, in accordance with one or more techniques of this disclosure. For purposes of illustration, the exemplary technique illustrated in FIG. 3 will be described with respect to controller 8 of FIG. 2. However, the techniques may be used with any combination of hardware or software.

DPMM 28 may determine whether data to be stored to mixed-use buffer 13 includes a first type of data (42). For example, DPMM 28 may determine the data includes a first type of data (e.g., customer data) in response to determining that the data is associated with host device 4. DPMM 28 may determine the data includes a second type of data in response to determining that the data is not associated with host device 4 (e.g., the data is associated with non-media or non-buffer commands or is used for purposes internal to storage device 6).

DPMM 28 may determine to which section of mixed-use buffer 13 to store the data. For example, DPMM 28 may make the determination based on the type of data. For instance, if DPMM 28 determines that the data includes a first type of data, DPMM 28 may determine to store the data in a first section (e.g., an empty section or a section that already includes protected data) and may store the data in the first section (44). However, in some instances, if DPMM 28 determines that the data includes a second type of data, DPMM 28 may determine to store the data in a second data section (e.g., an empty section or a section that includes unprotected data) (48).

DPMM 28 may determine whether to apply data protection to the data based on the type of data. For example, DPMM 28 may determine to apply data protection if the data includes a first type of data (e.g., customer data). DPMM 28 may apply data protection to the data (46) by appending error detection data to a page within the first section. For instance, DPMM 28 may store the error detection data within metadata associated with the first type of data. In some examples, DPMM 28 may determine to refrain from applying data protection if the data includes a second type of data (e.g., non-customer data) and may thus refrain from applying data protection (50) to the data.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage medium.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A data storage device comprising:
 a volatile memory device;
 a non-volatile memory device;
 a mixed-use buffer including of a plurality of sections, each section including a plurality of pages, wherein the mixed-use buffer is configured to store customer data and non-customer data; and
 a controller configured to:
  receive data to be stored to a first section or a second section of the mixed-use buffer;
  determine whether the data to be stored comprises a first type of data pertaining to customer data from a host device coupled to the controller or a second type of data pertaining to non-customer data internal to the storage device;
  in response to determining that the data comprises the first type of data including customer data and error detection data,
   apply data protection to the data; and
   store the data to the first section of the mixed-use buffer, the first section comprising protected data; and
  in response to determining that the data comprises a second type of data,
   refrain from applying data protection to the data; and
   store the data to the second section of the mixed-use buffer, the second section comprising unprotected data.

2. The data storage device of claim 1, wherein the controller is configured to apply data protection to the data by at least appending error detection data to at least one page of the section.

3. The data storage device of claim 1, wherein the controller is further configured to:
store, to a buffer usage lookup table, information about each section of the mixed-use buffer, wherein the information includes:
a section identifier;
a section usage identifier indicative of the type of data stored to the section; and
a protected page identifier that indicates whether at least one page of the section includes data protection.

4. The data storage device of claim 1, wherein the controller is further configured to:
receive, from a host device, a read command, wherein the read command includes a command to read data from a particular section of the mixed-use buffer;
determine, based on a section usage identifier associated with the particular section, whether the particular section comprises the first type of data;
in response to determining that the particular section comprises the first type of data, read the data from the particular section and send the data to the host device; and
in response to determining that the particular section does not comprise the first type of data, send a message to the host device indicating that the particular section does not comprise the first type of data.

5. The data storage device of claim 1, wherein the mixed-use buffer is accessible to store at least the customer data and the non-customer data.

6. A method comprising:
receiving, by a controller, data to be stored to a first section or a second section of a mixed-use buffer, wherein the mixed-use buffer comprises a plurality of sections, wherein the mixed-use buffer is a part of a storage device that additionally includes a non-volatile memory device and a volatile memory device;
determining whether the data to be stored comprises a first type of data pertaining to customer data from a host device coupled to the controller or a second type of data pertaining to non-customer data internal to the storage device;
in response to determining that the data comprises the first type of data,
applying, by the controller, data protection to the data; and
storing the data to the first section of the mixed-use buffer, the first section comprising protected data; and
in response to determining that the data comprises a second type of data,
refraining from applying, by the controller, data protection to the data; and storing the data to the second section of the mixed-use buffer, the second section comprising unprotected data.

7. The method of claim 6, wherein applying data protection to the data includes at least appending error detection data to at least one page of the section.

8. The method of claim 6, further comprising:
causing, by the controller, information about each section of the mixed-use buffer to be stored to a buffer usage lookup table, wherein the information includes:
a section identifier;
a section usage identifier indicative of the type of data stored to the section; and
a protected page identifier that indicates whether at least one page of the section includes data protection.

9. The method of claim 6, further comprising
receiving, by the controller and from the host device, a read command, wherein the read command includes a command to read data from a particular section of the mixed-use buffer;
determining, by the controller and based on a section usage identifier associated with the particular section, whether the particular section comprises the first type of data;
in response to determining that the particular section comprises the first type of data:
reading, by the controller, data from the particular section;
sending, by the controller, the data to the host device; and
in response to determining that the particular section does not comprise the first type of data:
sending, by the controller, a message to the host device indicating that the particular section does not comprise the first type of data.

10. The method of claim 6, wherein the mixed-use buffer is accessible to store at least the customer data and the non-customer data.

11. A non-transitory computer-readable storage medium storing instructions that, when executed, cause a controller of a data storage device to:
receive data to be stored to a first section or a second section of a mixed-use buffer, wherein the mixed-use buffer comprises a plurality of sections, wherein the mixed-use buffer is a part of the data storage device that additionally includes a non-volatile memory device and a volatile memory device;
determine whether the data to be stored comprises a first type of data pertaining to customer data from a host device coupled to the controller or a second type of data pertaining to non-customer data internal to the storage device;
in response to determining that the data comprises the first type of data including customer data and error detection data,
apply data protection to the data and
store the data to the first section of the mixed-use buffer, the first section comprising protected data; and
in response to determining that the data comprises a second type of data,
refrain from applying data protection to the data and
store the data to the second section of the mixed-use buffer, the second section comprising unprotected data.

12. The non-transitory computer-readable storage medium of claim 11, wherein the instructions cause the controller to apply data protection to the data by at least appending error detection data to at least one page of the section.

13. The non-transitory computer-readable storage medium of claim 11, further comprising instructions that, when executed, cause the controller to:
store, to a buffer usage lookup table, information about each section of mixed-use buffer, wherein the information includes:
a section identifier;

a section usage identifier indicative of the type of command that caused data to be stored to the section; and a protected page identifier that indicates whether at least one page of the section includes data protection.

14. The non-transitory computer-readable storage medium of claim 11, further comprising instructions that, when executed, cause the controller to:

receive, from the host device, a read command, wherein the read command includes a command to read data from a particular section of the mixed-use buffer;

determine, based on a section usage identifier associated with the particular section, whether the particular section comprises the first type of data;

in response to determining that the particular section comprises the first type of data, reading the data from the particular section of the mixed-use buffer and sending the data to the host device; and in response to determining that the particular section does not comprise the first type of data, sending a message to the host device indicating that the host device did not write the data at the particular section.

15. The non-transitory computer-readable storage medium of claim 11, wherein the mixed-use buffer is accessible to store at least the customer data and the non-customer data.

16. A system comprising:

means for receiving data to a first section or a second section of a mixed-use buffer, wherein the mixed-use buffer comprises a plurality of sections, wherein the mixed-use buffer is a part of a storage device that additionally includes a non-volatile memory device and a volatile memory device;

means for determining whether the data to be stored comprises a first type of data pertaining to customer data from a host device coupled to the controller or a second type of data pertaining to non-customer data internal to the storage device;

means for, in response to determining that the data comprises the first type of data including customer data and error detection data, applying data protection to the data; and storing the data to the first section of the mixed-use buffer, the first section comprising protected data; and means for, in response to determining that the data comprises a second type of data, refraining from applying data protection to the data; and storing the data to the second section of the mixed-use buffer, the second section comprising unprotected data.

17. The system of claim 16, wherein means for applying data protection to the data includes means for at least appending error detection data to at least one page of the section.

* * * * *